(12) United States Patent
Moller

(10) Patent No.: US 12,734,945 B2
(45) Date of Patent: Sep. 15, 2026

(54) GOLF CART ARMREST

(71) Applicant: Scot R. Moller, Robstown, TX (US)

(72) Inventor: Scot R. Moller, Robstown, TX (US)

( * ) Notice: Subject to any disclaimer, the term of this patent is extended or adjusted under 35 U.S.C. 154(b) by 0 days.

(21) Appl. No.: 18/831,093

(22) Filed: Jul. 5, 2024

(65) Prior Publication Data

US 2025/0368113 A1 Dec. 4, 2025

Related U.S. Application Data

(60) Provisional application No. 63/525,137, filed on Jul. 5, 2023.

(51) Int. Cl.
*B60N 2/75* (2018.01)
*A01K 1/04* (2006.01)

(52) U.S. Cl.
CPC . *B60N 2/79* (2018.02); *A01K 1/04* (2013.01)

(58) Field of Classification Search
None
See application file for complete search history.

(56) References Cited

U.S. PATENT DOCUMENTS

2013/0267392 A1* 10/2013 Miranda ................ A63B 71/02 482/102
2014/0121063 A1* 5/2014 Wireman ............ A63B 71/023 482/23
2014/0123447 A1* 5/2014 Calvert ................. F16B 45/023 24/599.9
2016/0341239 A1* 11/2016 Inkavesvaanit ....... F16B 45/036
2020/0187458 A1* 6/2020 Onthank ............. A01K 27/005

* cited by examiner

*Primary Examiner* — Hung Q Dang
(74) *Attorney, Agent, or Firm* — G. Turner Moller, Jr.

(57) ABSTRACT

A golf cart armrest provides an anchor for a carabiner or similar device having an element movable between a first closed position and a second open position allowing a leash loop to be placed over the arm so that a pet leash can be easily attached and removed from the armrest.

19 Claims, 3 Drawing Sheets

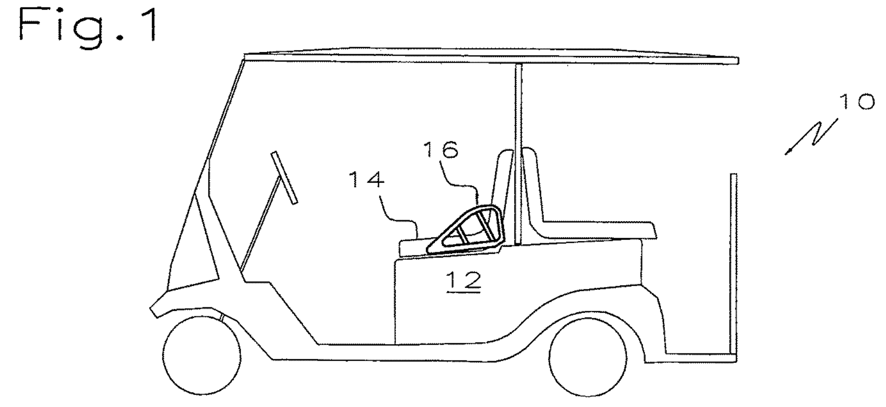
Fig.1
10
16
14
12
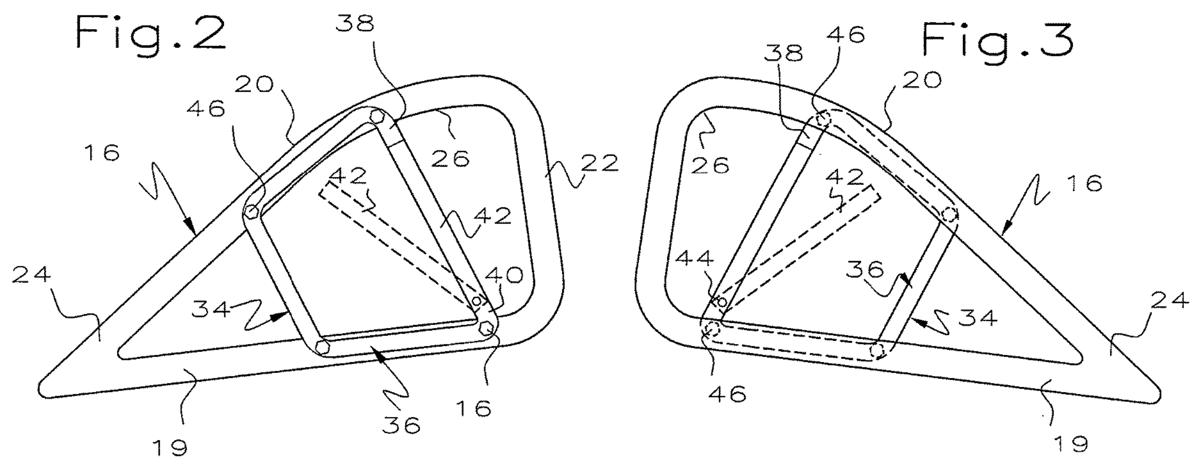
Fig.2
38
20
46
16
26
42
42
22
24
40
34
16
36
19
Fig.3
46
38
20
26
42
16
44
36
34
24
46
19
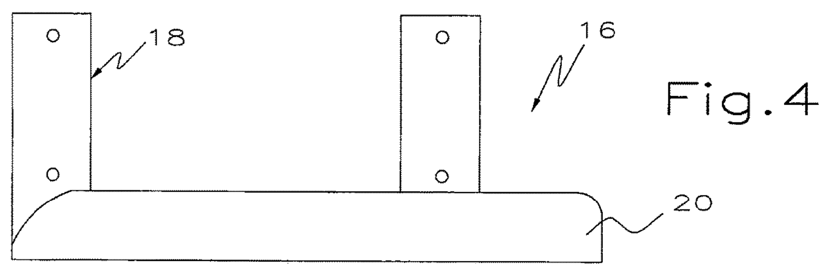
18
16
Fig.4
20

48
58
7
50
60
54
64
56
52
7
56
50
68
60
48
64
66
62

28
30
32
80
82

86
104
102
90
100
94
106
84
108
96
92
98
110
88
112
70
76
78
74
72

114
120
116
124
126
122
128
118

GOLF CART ARMREST

This invention relates to a golf cart, an armrest for a golf cart and a device to assist a driver to control a leashed animal. This application is based on Provisional Application Ser. No. 63/525,137, the disclosure of which is incorporated herein by reference.

BACKGROUND OF THE INVENTION

Golf carts are widely used for transportation on golf courses, other recreational areas and for general use. Often, a driver has a dog or other leashed animal in tow. It is awkward to hold a leash, requiring one hand, while the other hand must steer the vehicle, light a cigarette, drink from a cup or do the myriad other things that drivers do, safe or not.

The current standard approach to tether a leashed animal to a golf cart is to take advantage of the loop at the end of most leashes along with an armrest on the golf cart. Standard armrests are plastic or hard rubber on which the user's arm resides which is elevated from the golf cart body by a pair of struts, leaving an opening between the armrest and the golf cart. The free end of the leash is passed through the opening, inserted through the loop in the leash and pulled, thereby attaching the leash to the armrest. The animal is then attached to the leash by a conventional clip on the free end of the leash.

This approach is awkward because the leash must be removed from the animal while attaching the leash to the golf cart and removed from the animal when decoupling the leash from the armrest. This gives the dog or other leashed animal time and opportunity to leave thereby requiring the user to run down the animal and reattach the conventional clip to the animal's collar.

SUMMARY OF THE INVENTION

A golf cart armrest provides an anchor for a carabiner or similar device having an element movable between a first closed position and a second open position allowing a leash loop to be placed over the arm. In some embodiments, the carabiner comprises a pivotable trap door arm spring biased toward the closed position thereby captivating the leash to the armrest. The leash loop is accordingly attached and removed from the carabiner in a conventional manner which does not require removing the leash from the animal. Other uses for the leash handling ability of this invention will be apparent.

BRIEF DESCRIPTION OF THE DRAWINGS

FIG. 1 is a side view of a conventional golf cart;

FIG. 2 is a front view of one embodiment of the invention;

FIG. 3 is a view from the back side of the embodiment of FIG. 2;

FIG. 4 is a top view of the embodiment of FIGS. 2-3;

DETAILED DESCRIPTION OF THE INVENTION

Figures 5, 6, 7, 8, 9:
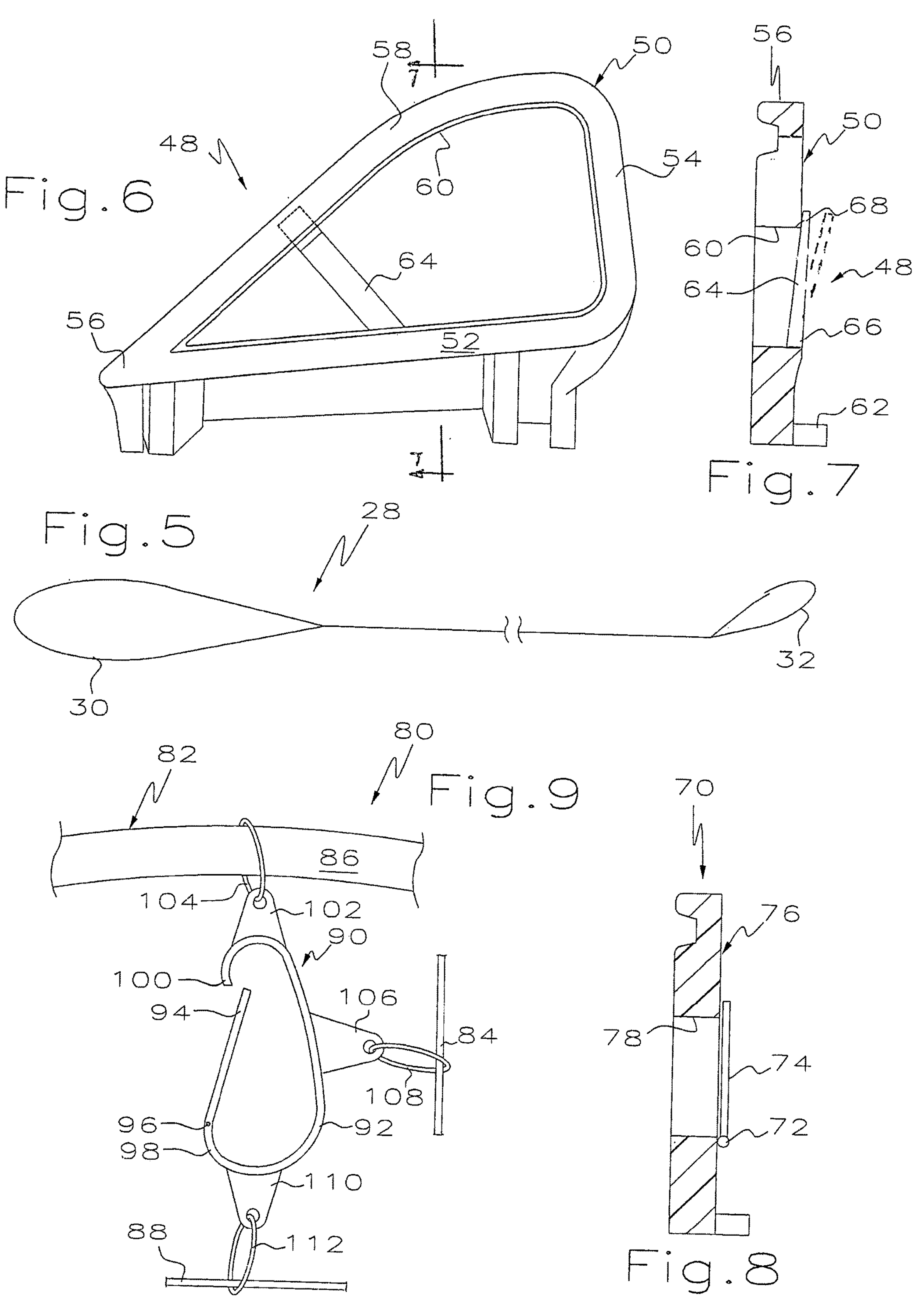
FIG. 5 is a view of a conventional animal leash.
FIG. 6 is a side view of another embodiment of this invention.
FIG. 7 is a cross-sectional view of the embodiment of FIG. 6, taken along line 7-7 thereof as viewed in the direction indicated by the arrows.
FIG. 8 is a view, similar to FIG. 7, of another embodiment of this invention.
FIG. 9 is a front view of another embodiment of this invention.

A golf cart 10 is of conventional description having a plurality of wheels, some of which are driven by an electric motor or internal combustion engine and steered in a conventional manner by a steering wheel. Typically, golf carts 10 are open to the weather and include a body 12 and a passenger/driver bench seat 14. As shown in FIGS. 1-4, a pair of armrest assemblies 16 extend upwardly from adjacent each side of the seat 14. Typically, the armrest assemblies 16 are molded of plastic or hard rubber having one or more generally horizontal brackets 18 connected to the bottom of the seat 14 by screws (not shown).

The armrest assemblies 16 accordingly each comprise a generally horizontal base 19 and an upright assembly fixed or integral to the base 19 including an armrest 20 and spaced uprights 22, 24 supporting the armrest 20 from the base 19 and providing an enlarged opening 26 through the armrest assembly 16. The overall shape of the armrest assembly 16 is either triangular or trapezoid-al, depending on how large the upright 24 is. As heretofore described, the golf cart 10 and armrest assemblies 16 are typical of current conventional golf carts. Reference is made to the golf carts and publications of manufacturers Club Car, E-Z-Go and Yamaha for a more complete description of conventional golf carts.

A typical animal leash 28 includes a loop end 30 and a clip or free end 32. To attach the leash 28 to the armrest 16 in a conventional manner, the loop end 30 is advanced through the opening 26 and the clip end 32 is threaded through the loop end 30 thereby captivating the leash 28 to the armrest assembly 16. The clip end 32 may be attached to the animal's collar (not shown).

In one embodiment of this invention shown in FIGS. 2-3, the armrest 16 provides an anchor for a more-or-less conventional carabiner type device 34. Carabiners are old and well known and typically include a generally C-shaped frame 36 having frame ends 38, 40 spaced apart to provide a gap therebetween. A mechanism is provided to selectively open and close the gap. In some embodiments, this mechanism may be a trap door arm 42 pivoted at one end to the frame end 40 for rotational movement about an axis provided by a pivotal connection 44. The opposite frame end 38 and the free end of the arm 42 include interdigitating elements (not shown) to make the frame 36 rigid in the closed position and to prevent pivotal movement of the arm 42 beyond the frame end 38. A spring (not shown) inside the pivotal connection 44 allows pivotal movement of the arm 42 away from the frame end 38 and biases the arm 42 toward the frame end 38. The arm 42 accordingly acts in carabiner fashion to provide a trap door into the interior of the carbineer frame 36.

The C-shaped frame 36 is fixed in any suitable fashion in the interior of the opening 26, as by providing aligned holes in the frame 36 and armrest assembly 16 and installing nut/bolt assemblies 46 to secure the frame 36 to the armrest assembly 16. Installing the leash 28 on the armrest assembly 16 is accomplished in a typical carabiner manner, i.e. the arm 42 is pushed inwardly of the opening in the frame 36 to expose the upper arm end so the loop end 30 of the leash 28 may be passed over the arm 42. Releasing the leash 28 allows the spring in the pivot connection 44 to close the arm 42 against the frame end 38 which captivates the leash 28.

One advantage of the embodiment of FIGS. 2-3 is the leash 28 naturally falls by gravity onto the lower frame end 40 of the frame 36 so any force applied by an animal on the end of the leash 28 is resisted by the armrest assembly 16 rather than by the arm 42.

It will be seen that the carabiner 34 and the trap door arm 42 are located wholly within the opening 26 and thus present no danger of snagging an occupant of the golf cart 10. Another way of viewing the carabiner 34 and the trap door arm 42 is that they obstruct the opening 26, which may be a common attribute of other embodiments of this invention.

Referring to FIGS. 6-7, an armrest assembly 48 includes a frame 50 having a base 52, uprights 54, 56 connected by an armrest 58 and providing an interior opening 60. The armrest assembly 48 includes suitable brackets 62 secured to the bench seat 14 of the golf cart 10 in any suitable manner. The material of a trap door arm 64 is integral with and the same as the material of the uprights 54, 56 and is slightly flexible to allow movement from a closed position abutting the frame 50 as shown in FIG. 7 to an open position shown in dashed lines in FIG. 7. The armrest assembly 48 is accordingly conveniently made by injection molding. The trap door arm 64 accordingly includes a flexible section acting to pivot between a closed position shown in solid lines in FIG. 7 to an open position thereby allowing the loop end 30 of the leash to be placed over the arm 64.

It may be preferred to make the trap door arm 64 thicker at its lower end 66 near its junction with the body of the armrest assembly 48 and thinner near the free end 68 of the arm 64. The loop end 30 falls by gravity onto the thick, more robust lower end while the thinner upper end provides the flexibility to move the arm to the open position to receive the leash 28. The arm 64 may be placed at any suitable location along the arm rest 56, taking into account that a longer arm 64 provides more flexibility at the cost of less strength. The armrest assembly 48 includes a carabiner of somewhat unusual configuration because the frame of the armrest assembly 48 also comprises the frame of the carabiner where the arm 68 opens and closes the entrance to the frame.

Referring to FIG. 8, another armrest assembly 70 is similar to the armrest assembly 48 except for the pivotal connection. Instead of a live hinge provided by the flexible member 64, a conventional pivot connection 72 attaches a trap door arm 74 to a frame 76 of the assembly 70. It will be seen that the trap door arm 74 is movable between a closed position abutting, the frame 76 and an open position allowing a user to place the loop end 30 of the leash 28 over the arm 74. The pivot connection 72 may include a spring to bias the arm 74 toward the closed position to captivate the leash 28 in much the same manner as conventional carabiners. The armrest assemblies 48, 70 are similar to the armrest assembly 16 because the respective trap door arms obstruct the openings in the armrest assemblies. The armrest assemblies 48, 70 differ from the assembly 16 because the trap door arms 64, 74 obstruct the openings 60, 78 but are not wholly within the openings 60, 78 and the arm 74 is not within the opening 78 at all.

Referring to FIG. 9, an armrest assembly 80 provides a frame 82 including an upright 84, an armrest 86 and a base 88 respectively analogous to the upright 54, the armrest 58 and the base 52 of the armrest assembly 48. A carabiner 90 includes a generally C-shaped frame 92 having a trap door arm 94 mounted by a pivotal connection 96 for pivotal movement on the frame 92 between a closed position connected at both ends to the frame 92 and an open position allowing a leash loop end 30 to be placed over the arm 94. A spring (not shown) in the pivotal connection 96 biases the trap door arm 94 to close a gap between ends 98, 100 of the frame 92. An upper bracket 102 on the frame 92 is provided to allow a first suitable flexible connector 104 or plastic tie to suspend the carabiner 90 from the armrest 86.

It will be seen that the carabiner 90 is free to move in any direction. To stabilize the carabiner 90, a second bracket 106 may be provided to allow a plastic tie 108 to prevent movement of the carabiner 90 away from the upright 84 which is a direction transverse to the suspending force of the first connector 104. Similarly, to further stabilize the carabiner 90, a third bracket 110 may be provided to allow a plastic tie 112 to prevent movement of the carabiner 90 away from the base 88 which is a direction transverse to the restraining force applied by the second connector 108. The embodiment of FIG. 9 has a cost advantage because the carabiner 90 may be considerably smaller than similar devices on the other embodiments.

Figure 10:
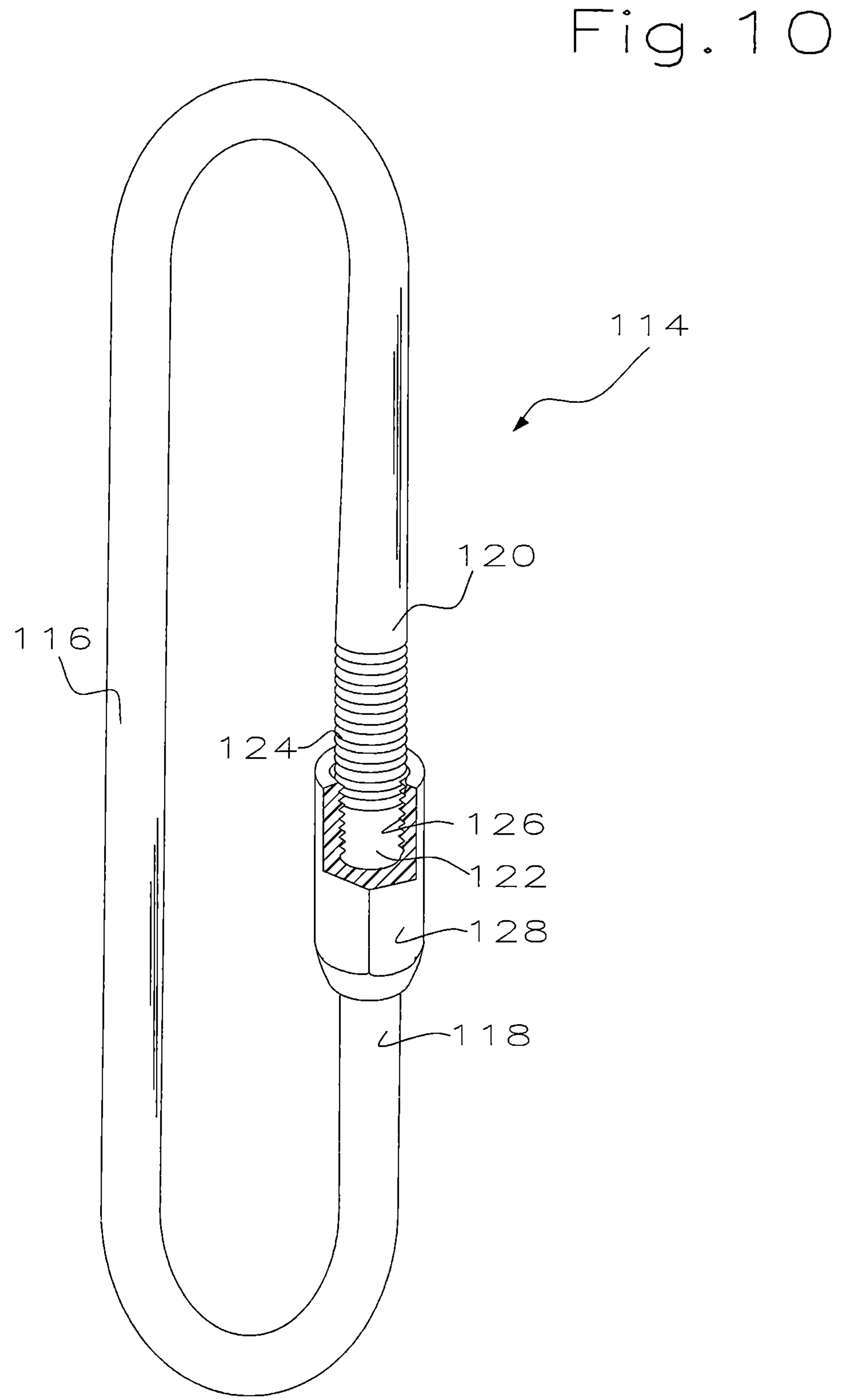
FIG. 10 is an isometric view of another type of carabiner which may be used in this invention.

Carabiners come in many different sizes and shapes and include many different types of mechanisms to open and close the gap between ends of the carabiner frame. Another typical carabiner 114, useful in any of the embodiments of this invention is shown in FIG. 10, includes a C-shaped frame 116 having ends 118, 120 providing a gap 122. Frame end 120 includes threads 124 meshing with threads 126 on the interior of a nut 128 movably mounted, but captivated, on the frame end 118. Operation of the carabiner 114 is conventional in that unthreading the nut 128 allows the nut 128 to move away from the threaded end 120 thereby exposing the gap 122 and allowing the leash loop end 30 to be placed over the exposed frame end. It will be seen that the nut 128 comprises a trap door arm acting to open and close the gap 122 upon movement between open and closed positions.

Although this invention has been disclosed and described in its preferred form with a certain degree of particularity, it is understood that the present disclosure of the preferred form is only by way of example and that numerous changes in the details of operation and in the combination and arrangement of parts may be resorted to without departing from the spirit and scope of the invention.

I claim:

1. An armrest assembly configured to be attached to a golf cart of the type comprising a motorized vehicle having a seat, the armrest assembly being adjacent one side of the seat, the armrest assembly including an opening therein and further comprising a carabiner extending across and at least partially obstructing the opening.

2. The armrest assembly of claim 1 wherein the carabiner comprises a trap door arm movably mounted between an open position configured to receive a looped leash end thereon and a closed position configured to prevent removal of the looped leash end, the trap door arm being, in one of the positions, obstructing the opening.

3. The armrest assembly of claim 2 the trap door arm being spring biased toward the closed position.

4. The armrest assembly of claim 2 further comprising a pivotal connection mounting the trap door arm for pivotal movement between the open and closed positions.

5. The armrest assembly of claim 2 wherein the trap door arm includes a flexible section of a material integral with material of the armrest assembly, the flexible section being configured to allow movement of a free end of the flexible section toward the open position.

6. The armrest assembly of claim 5 wherein the flexible section is configured to bias the trap door arm toward the closed position.

7. The armrest assembly of claim 5 wherein the armrest assembly includes a frame and the flexible section includes a base comprising a junction with the armrest frame and a free end, the base being of greater thickness than the free end.

8. The armrest assembly of claim 2 wherein the trap door arm is partly in and partly out the opening in the both the open and closed positions.

9. The armrest assembly of claim 2 wherein the trap door arm is in the opening in the open position and in the closed position.

10. The armrest assembly of claim 2 wherein the trap door arm is completely out of the opening in both the open and closed positions.

11. The armrest assembly of claim 2 wherein the trap door arm wholly resides in the opening.

12. The armrest assembly of claim 1 wherein the carabiner includes a carabiner frame having spaced ends and a trap door arm, the trap door arm being mounted on the carabiner frame for movement between a closed position spanning the spaced ends and, an open position exposing the spaced ends, the trap door arm in the open position being configured to receive a loop end of an animal leash and further comprising a flexible member suspending the carabiner frame on the armrest assembly in a position at least partly obstructing the opening.

13. The armrest assembly of claim 12 wherein the flexible member is a first flexible member and the first flexible member is configured to apply a force opposing gravity to the carabiner and thereby mount the carabiner for movement relative to the armrest assembly and further comprising a second flexible member connected to the carabiner frame and to the armrest, the second flexible member connecting the carabiner frame and the armrest assembly frame, the second flexible member being configured to apply a second force transverse to the first flexible member and thereby restrain movement of the carabiner frame in one direction.

14. A carabiner comprising a frame having spaced ends providing a gap therebetween, a member mounted on the frame for movement between a first position spanning the gap and a second position exposing the gap and configuring the carabiner to receive a loop end, the carabiner including a first bracket on the carabiner frame configured to receive a first flexible connector to suspend the carabiner frame from a support and apply a supporting force to the carabiner in a first direction and to allow movement of the carabiner frame in multiple directions other than the first direction, and a second bracket on the carabiner frame configured to receive a second flexible connector to prevent movement of the carabiner frame in a second direction transverse to the first direction.

15. The carabiner of claim 14 further comprising a third bracket on the carabiner frame configured to receive a third flexible connector to prevent movement of the carabiner in a third direction transverse to the second direction.

16. An armrest assembly configured to be attached to a golf cart of the type comprising a motorized vehicle having a seat, the armrest assembly being adjacent one side of the seat, the armrest assembly including an opening therein and further comprising a carabiner extending into and at least partially obstructing the opening.

17. The armrest assembly of claim 16 further comprising first and second connectors securing the carabiner to the armrest assembly at spaced locations.

18. The armrest assembly of claim 17 wherein at least one of the connectors is flexible.

19. The armrest assembly of claim 16 further comprising first, second and third connectors securing the carabiner to the armrest at three spaced locations.

* * * * *